United States Patent
Thomson et al.

(10) Patent No.: US 7,827,270 B2
(45) Date of Patent: Nov. 2, 2010

(54) MOBILITY SERVICE CLUSTERING USING NETWORK SERVICE SEGMENTS

(75) Inventors: Allan Thomson, Pleasanton, CA (US); David Stephenson, San Jose, CA (US); Rohit Suri, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 12/174,792

(22) Filed: Jul. 17, 2008

(65) Prior Publication Data

US 2009/0113018 A1 Apr. 30, 2009

Related U.S. Application Data

(60) Provisional application No. 60/984,115, filed on Oct. 31, 2007.

(51) Int. Cl.
*G06F 15/173* (2006.01)
*G06F 15/16* (2006.01)

(52) U.S. Cl. .................. 709/223; 709/226; 709/208

(58) Field of Classification Search .................. 709/233, 709/226, 205, 208
See application file for complete search history.

(56) References Cited

U.S. PATENT DOCUMENTS 6,732,177 B1 * 5/2004 Roy ........................... 709/227

| | | | |
|---|---|---|---|
| 2002/0049842 A1 | 4/2002 | Huetsch et al. |
| 2002/0062377 A1 | 5/2002 | Hillman et al. |
| 2003/0074453 A1 | 4/2003 | Ikonen |

FOREIGN PATENT DOCUMENTS

| | | | |
|---|---|---|---|
| CN | 1479466 A | * | 3/2004 |
| EP | 1 117 227 A1 | | 7/2001 |
| WO | WO 98/31107 | | 7/1998 |
| WO | WO 2005/064896 | | 7/2005 |

OTHER PUBLICATIONS

International Search Report dated Apr. 2, 2009 for International Application No. PCT/US2008/079920.
Christoffer Andersson: "GPRS and 3G Wireless Applications" Sep. 26, 2001, XP002520831, pp. 181-202.

* cited by examiner

*Primary Examiner*—Wing F Chan
*Assistant Examiner*—Nam Thai
(74) *Attorney, Agent, or Firm*—Tucker Ellis & West LLP

(57) ABSTRACT

Described in an example embodiment herein is a Mobility Service Engine (MSE) cluster comprising an MSE Cluster Master and at least one MSE Cluster Slave. The MSE Master is configured to define Network Service Segments. The MSE Master of the cluster distributes the Network Service Segments to slaves within the cluster. The network is configured to forward data to the correct Network Service Segment.

20 Claims, 8 Drawing Sheets

MOBILITY SERVICE CLUSTERING USING NETWORK SERVICE SEGMENTS

CROSS-REFERENCE TO RELATED APPLICATION

This application claims the benefit of priority of U.S. Provisional Application No. 60/984,115 filed Oct. 31, 2007.

TECHNICAL FIELD

This application is generally directed to providing network services using a cluster design that can enable services to be distributed and balanced within the cluster.

BACKGROUND

Mobility services are a set of value added services that leverage a unified network infrastructure. Mobility services may include, but are not limited to, location tracking, voice handoff between different mobile networks and passive RFID (radio frequency identification location tracking). In small, simple networks, mobility services can be provided by a single device, which can be a standalone device or a device, such as an access point (AP) controller, router, etc. that is configured to also provide mobility services. However in larger networks, mobility services may be provided by several devices and/or co-located within several infrastructure nodes, which can make determining the appropriate device handling a mobility service problematic. For example, a plurality of backend servers can be employed for providing services such as asset tracking, voice routing and call handoff. A mobility service engine (MSE) provides a unified Application Programming Interface (API) to applications and servers providing services. The MSE also provide a unified protocol for applications and servers communicating with devices and controllers. A single MSE may provide multiple mobility services.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
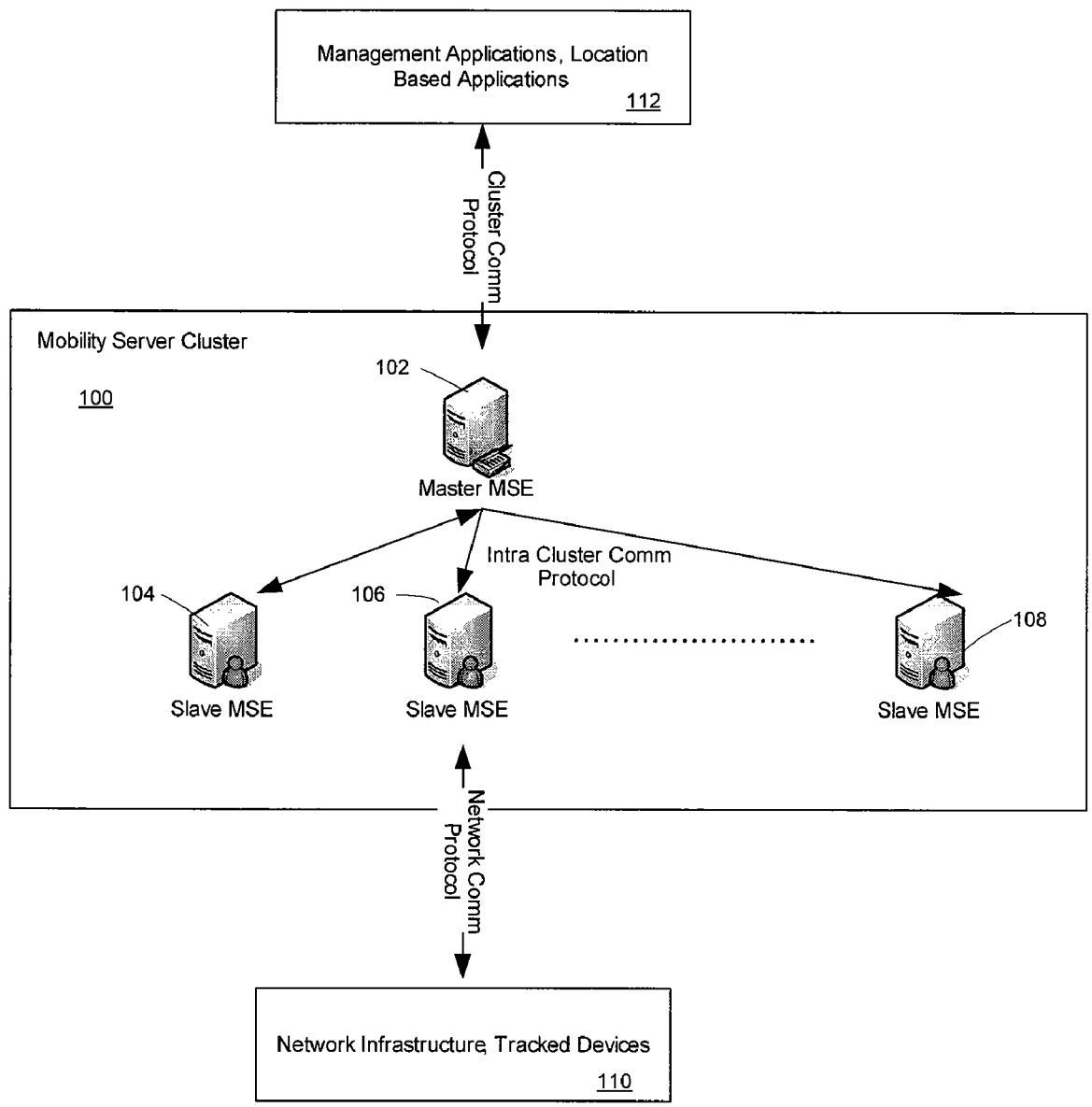
FIG. 1 illustrates an example of a network employing a Mobility Service Cluster.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

Described in an example embodiment herein is a Mobility Service Engine (MSE) cluster comprising a MSE Cluster Master and at least one MSE Cluster Slave. The MSE Master is configured to define Network Service Segments. A NSS is a cohesive grouping that provides one or more mobility services across a set of related infrastructure nodes such as Access Points (APs). The MSE Master of the cluster distributes the Network Service Segments to slaves within the cluster. The slaves then distribute assignments to the network. Whenever service traffic for a particular NSS occurs in the network, the network infrastructure looks up the mapping of NSS to MSE Slave and then forwards relevant service data for that NSS to that MSE Slave.

In an example embodiment, there is disclosed herein an apparatus comprising a communication interface, and logic configured to receive data from the communication interface. The logic is configured to acquire data representative of at least one MSE cluster slave belonging to a mobility service cluster via the communication interface. The logic is further configured to acquire physical layout data. The logic is configured to form at least one network service segment based on the physical layout data.

In an example embodiment, there is disclosed herein a system, comprising a MSE cluster master, a first MSE cluster slave in communication with the MSE cluster master and a second MSE cluster slave in communication with the MSE cluster master. A first controller is in communication with the first MSE cluster slave and the second MSE cluster slave, and a second controller is in communication with the first MSE cluster slave and the second MSE cluster slave. The MSE cluster master logic is configured to acquire data representative of at least one MSE cluster slave belonging to a mobility service cluster via the communication interface. The MSE cluster master is configured to acquire physical layout data comprising areas serviced by infrastructure nodes coupled to the first controller and areas serviced by infrastructure nodes coupled to the second controller. The MSE cluster master is configured to form at least one network service segment, the network service segment is a cohesive grouping that provides at least one mobility service across a set of related infrastructure nodes. The MSE cluster master is further configured to assign the network service segment to a cluster slave selected from the group consisting of the first MSE cluster slave and the second MSE cluster slave to service. The selected cluster slave is configured to communicate a routing path to the cluster master to the controllers having infrastructure nodes belonging to the network service segment.

Disclosed herein in an example embodiment is a method that comprises determining MSE slaves belonging to a cluster, determining all devices managed by the cluster, and receiving radio frequency neighbor environment data from controllers associated with the cluster. A plurality of network service segments are formed for the cluster based on the radio frequency environment. The network service segment is a cohesive grouping that provides at least one mobility service across a set of related infrastructure nodes. Each of the plurality of network service segments is assigned to not more than one of the MSE slaves.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements.

Described in an example embodiment herein is a Mobility Service Engine (MSE) cluster comprising a MSE Cluster Master, which can be selected or assigned, and at least one MSE Cluster Slave. The network is organized into physical areas, for example building, floor, areas within a floor, outdoor parking lots, etc., provided with a particular service. A NSS is a cohesive grouping that provides one or more mobility services across a set of related infrastructure nodes such as Access Points (APs). The NSS for each service may be formed differently depending on the individual service requirements. For example, an NSS in an area with a high concentration of APs and/or mobile devices can be smaller than a NSS with a lower concentration of APs and/or mobile devices. As another example, a NSS for tracking associated devices may be smaller than a NSS for tracking rogue devices. Once a NSS is formed, the Master MSE assigns the NSS to a particular Slave MSE. The Slave MSE then informs the set of devices for the NSS, such as controllers and switches and/or Access Points, that it will be responsible for the NSS and that those devices should forward relevant data for the service to the Slave MSE. Disclosed in an example embodiment herein is an algorithm for performing auto-assignment.

A MSE is a platform that can run a variety of services such as location tracking, voice handoff, spectrum analysis, passive RFID (Radio Frequency Identification). A collection of mobility server clusters can be connected to provide geographically distributed mobility services.

In an example embodiment, an MSE cluster comprises a MSE Cluster Master and one or more MSE cluster slaves. The physical network is organized into Network Service Segments that are auto-assigned by the MSE Cluster Master. The auto-assignment will organize the network based on the service (e.g. location for clients, location for rogues, etc.) into Network Service Segments.

For example, a MSE Cluster Master determines all MSE Cluster Slaves within the cluster. The MSE Cluster Master also determines all network devices (controllers, access points, etc.) managed by the cluster. The MSE Cluster Master is configured with the physical environment (for example campus, buildings, outdoor areas, etc.). The configuration can be received via a management system, such as for example a Wireless Controller System. The MSE Cluster Master determines the RF neighbor environment from the controllers. The MSE Cluster Master performs an auto-assignment algorithm to form Network Service Segments for each service type serviced by the cluster. The auto-assignment algorithm defines the physical boundaries for each NSS. The MSE Cluster Master distributes the Network Service Segments to the MSE Cluster Slaves.

The MSE Cluster Slaves configure controllers, switches, etc. that are part of their NSS to forward data for their NSS. A controller may belong to more than one NSS. Controllers will maintain a mapping of AP/Data to NSS/Slave.

Controllers forward appropriate service data (e.g. measurements) to the MSE Cluster Slave servicing the NSS. MSE Cluster Slaves receive the data and process the data (e.g. calculate, perform a service, store, etc.). The MSE Cluster Master monitors the load of NSS processing on each MSE Cluster Slave and determines dynamically whether to redistribute Network Service Segments across MSE Cluster Slaves to ensure that the load is evenly distributed. If a MSE Cluster Slaves fails, the MSE Cluster Master can automatically redistribute the Network Service Segments assigned to the failed slave to one or more active MSE Cluster Slaves.

In an example embodiment, the MSE Cluster Master forms one or more Network Service Segments from all Access Points (APs) and Switch ports. For example, a simple indoor network with one building may have one NSS. Complex or large indoor environments may result in multiple Network Service Segments. As will be illustrated in an example embodiment herein, outdoor areas between buildings may be considered a separate NSS and may overlap indoor areas. A NSS can be service specific, for example, one NSS for location, one NSS for voice handoff, etc.

FIG. 1 illustrates an example of a network employing a Mobility Service Cluster 100. Mobility Service Cluster 100 comprises a single Master Mobility Server Engine (MSE Cluster Master or "M-MSE") 102 and one or more Slave Mobility Server Engines (MSE Cluster saves or "S-MSE") 104, 106, 108. Although the example in FIG. 1 shows three S-MSEs, this should not be construed as limiting the size of a Mobility Service Cluster as the number of S-MSEs illustrated in FIG. 1 is merely for ease of illustration as the number of S-MSEs can be any physically realizable number.

The Master MSE 102 is a logical entity. The Master MSE 102 can reside on any node within a cluster 100 or may be instituted on a separate dedicated hardware engine. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. Slave MSEs 104, 106, 108 are also logical entities, and like Master MSE 102 can reside on any node within a cluster 100 or may be instituted on a separate dedicated hardware engine.

The Mobility Service Cluster 100 can provide services to infrastructure nodes and/or tracked devices coupled to the Network Infrastructure 110 employing any network communication protocol. Mobility Service Cluster 100 can use a cluster communication protocol to communicate with Management applications and/or location based applications 112. The services being provided and/or the network elements that are receiving services may be distributed across multiple MSE platforms.

In an example embodiment, Master MSE 102 acquires RF neighbor maps from controllers (not shown, see for example FIGS. 4-7) in the network managed by the mobility server cluster. The Master MSE 102 is configured to combine the RF neighbor maps with the physical layout (e.g. building) of the network. Where possible, the Master MSE 102 keeps adjacent floors of a building within the same NSS. Master MSE 102 determines the active service(s) for the MSE Cluster NSS.

Master MSE 102 employs an algorithm to evenly divide the NSS across the set of S-MSEs 104, 106, 108. In an example embodiment, where possible, the Master MSE 102 assigns NSS within the same proximity to the same S-MSE.

For example, Master MSE 102 may form one or more NSS from all APs and switch ports (not shown). For example, for a simple indoor, one building Master MSE 102 may form one NSS. This provides the simplest NSS environment wherein all switches and/or APs belong to the same NSS. For a complex indoor, one building network, Master MSE 102 may form multiple NSS. Typically, multiple NSS are formed for large buildings or buildings with large AP/Switch port counts. In addition, outdoor areas are considered. A NSS may overlap where indoor and outdoor areas are physically close (see e.g. FIGS. 4-7). In an example embodiment, a NSS is service specific. For example one NSS may be employed for location services, one NSS for voice handoff, and another NSS for passive handoff, etc.

In an example embodiment, each NSS is assigned to a single S-MSE. In particular embodiments the NSS is assigned to multiple S-MSE's, for example if the NSS is too large to be serviced by a single S-MSE. Multiple NSS may be assigned to the same S-MSE. For each mobility server cluster, all switches, controllers, network designs and APs are configured on the M-MSE 102. The configurations are communicated to the appropriate S-MSE. Each S-MSE 104, 106, 108 pushes its NSS list to each controller that is currently managing APs belonging to the NSS. Each AP will be configured with NSS assignments by the controller.

In an example embodiment, whenever a measurement or relevant information is retrieved on a NSS, the controllers forward the data to the appropriate MSE providing the location service registered for the NSS. If a single AP is in multiple NSS, the measurement data is sent to all MSE running location service. Each controller may be communicating with multiple S-MSE at the same time, but for different NSS.

In operation, when a tracked element appears on multiple MSEs, all MSEs process the service for the tracked element (e.g. calculated location or determine voice handoff events). S-MSEs periodically pass confidence factor data, time, and number of measurements to the M-MSE 100. M-MSE 100 decides which S-MSE provides primary service to the tracked element. The M-MSE 100 notifies all secondary service providers to forward data to the primary service provider for the tracked element. Forwarding rules can be aged out on each S-MSE automatically if no data is received after a configurable time period.

In an example embodiment, the mapping of APs to NSS is periodically refreshed for network topology changes based on the RF neighbor reports plus AP to controller mappings by processing logic 802. A mobility domain is a group of mobility groups, where a mobility group is a set of controllers that support fast roaming. All controllers in a mobility domain have NSS mappings. APs locally store NSS mappings in non-volatile memory and provide them to a controller when connecting to the controller. An S-MSE detects topology changes and updates the master. The M-MSE should receive either directly or indirectly topology change updates from controllers and S-MSEs. In particular embodiments, a NSS does not cross mobility domain boundaries. For example, when an AP joins a new controller, the new controller receives the NSS mappings for the AP and the Controller contacts S-MSE. The S-MSE and/or M-MSE can determine whether the AP should remain with the same NSS or be assigned to another NSS.

In an example embodiment, the Master MSE 102 provides Master MSE functions described herein. For example, all configurations for the cluster are configured on the M-MSE 102. The Master MSE 102 synchronizes the configuration as necessary with the set of S-MSEs 104, 106, 108. The Master MSE 102 can provide directory services. For example the Master MSE 102 can provide a directory lookup for all tracked devices and on which S-MSE the tracked device is currently located and which service is being provided by which slave and which clients are using which services. A network design is the definition of a physical environment of the network such as campuses, buildings, floors, areas and their physical dimensions. The Master MSE 102 can provide a directory lookup for all network designs (and parts of), controllers that each S-MSE is currently tracking. The Master MSE 102 can also provide auto assignment. For example, the Master MSE 102 can automatically determine which S-MSE manages which parts of the physical and network topology. The Master MSE 102 provides for Load-Balancing. For example, the M-MSE load balances across the set of S-MSEs 104, 106, 108 in the cluster based on network and physical environment active monitoring and feeds this data into the auto-assignment algorithms. Master MSE 102 can also provide for High Availability (HA) for M-MSE functions. Master MSE 102 can also provide redundancy control. Upon detection of S-MSE failure, Master MSE 102 can perform standby coordination with another S-MSE in the cluster. Master MSE 102 can be suitably configured to maintain history data. The history data including tracked device information, location, roaming, etc is aggregated by Master MSE 102. Master MSE 102 can also provide Time Synchronization. For example, Master MSE 102 can provide a central time synchronization function so that all S-MSE 104, 106, 108 are in sync when reporting time for live or historical data.

In an example embodiment, the Master MSE 102 provides an Application Programming Interface (API). External applications communicate with the Master MSE 102 to manage the cluster, query cluster information or subscribe to events. Queries and subscriptions are pushed to the appropriate set of S-MSE based on the scope of query or subscription. If a query or subscription is for an area or floor then Master MSE 102 uses the directory services to map the query to the correct S-MSE that is tracking that floor. For queries that may span multiple S-MSE, Master MSE 102 provides aggregation query capability.

In an example embodiment, Master MSE 102 is managed by a Wireless Control System (WCS), a suitable Wireless Control System is available from Cisco Systems, Inc., 170 West Tasman Drive, San Jose, Calif. 95134 (hereinafter- "Cisco"). The Master MSE 102 comprises a central configuration database that includes all network designs, controllers, switches, APs. The Master MSE 102 has a central directory of S-MSE IP address, authentication credentials, etc. This data could be configured by WCS and pushed to the Master MSE 102. Alternatively, this data could be auto-discovered by using DNS and having each mobility service cluster assigned a Domain Name Service ("DNS") domain, each S-MSE 104, 106, 108 is assigned locally to the domain. Master MSE 102 synchronizes the central configuration database with all of the S-MSEs 104, 106, 108. Synchronization can be event driven (for example when it is configured on the Master MSE 102 by WCS) and periodically checked for changes by the Master MSE 102 reading each S-MSE's 104, 106, 108 change count on the configuration database. Cluster status monitoring is provided by Master MSE 102 to WCS. This can include Up/down status of S-MSEs 104, 106, 108 and/or Load monitoring on each S-MSE 104, 106, 108.

In an example embodiment, the Master MSE 102 maintains a directory service lookup for tracked devices to S-MSE. The directory may suitably comprise multiple indexes. For example a Primary index comprising Media Access Control (MAC) Addresses, a Secondary index comprising IP Addresses and a Tertiary index comprising Usernames. The actual tracked device information is stored on the S-MSE. Each S-MSE 104, 106, 108 sends a notification to Master MSE 102 as tracked devices appear on their network segment. The Master MSE 102 updates the directory service if that device has roamed from another S-MSE. When two S-MSEs are tracking the same device, the Master MSE 102 updates the directory service when the secondary S-MSE becomes the primary S-MSE (the primary S-MSE then becomes the secondary S-MSE). The Master MSE 102 maintains a directory lookup for all network designs, the network segments, switches and controllers that each S-MSE 104, 106, 108 is currently tracking. All directory services information can be exposed for query by applications or S-MSEs 104, 106, 108.

In an example embodiment, the Master MSE 102 performs historical data aggregation. As devices are tracked in the network by the S-MSE history and data is collected over time on that device. This information is persistent on the S-MSE until successfully archived on Master MSE 102, then flushed from the S-MSE. Periodically this information is "posted" to Master MSE 102 for aggregation and archiving. Posting to Master MSE 102 can be based on volume of data as well as time-based triggers. Master MSE 102 has the responsibility to correctly order all data sent from multiple S-MSE for the same tracked device, thus all S-MSEs 104, 106, 108 and Master MSE 102 are time synchronized.

In an example embodiment, the Master MSE 102 provides load balancing. Static and Dynamic load balancing can be provided. For static load balancing, part of the auto-assignment algorithm assigns appropriate NSS across S-MSE. For dynamic load balancing, Master MSE 102 is configured to detect the load on each S-MSE 104, 106, 108 and per-NSS load on that S-MSE. This enables Master MSE 102 to determine how to re-organize NSS assignments across S-MSE based on tracking load.

In an example embodiment, the Master MSE 102 provides redundancy control. The Master MSE 102 and each S-MSE 104, 106, 108 can employ a heart-beat signal between them. After detection of an S-MSE failure, Master MSE 102 will automatically reallocate all network segments assigned to the failed S-MSE to one or more other S-MSE in the cluster. Upon detecting recovery of the S-MSE, Master MSE 102 will perform the automatic balancing of network segments again.

In an example embodiment, Master MSE 102 is provided by a High Availability (HA). A HA Pair is a set of two servers that provide duplicate function. Master MSE 102 and/or an S-MSE can belong to HA Pair. Each device in the HA Pair has a shared virtual IP address and individual IP address. A HA database option will synchronize all state and persistent data. In particular embodiments, all necessary state data for handoff is stored in a database. Non persistent state (e.g., Received Signal Strength Indication "RSSI" cache) is rebuilt upon failover.

In an example embodiment, Master MSE 102 can be employed to implement slave MSE functions. For each network location segment assigned to the S-MSE, Master MSE 102 provides tracking of the network topology and devices in that topology, query and subscription processing on the network topology and devices and/or RF Neighbor topology monitoring and forwarding changes to the Master MSE 102. Any event subscriptions from external applications configured on the S-MSE by Master MSE 102 will be handled directly from the S-MSE to the application.

Figure 2:
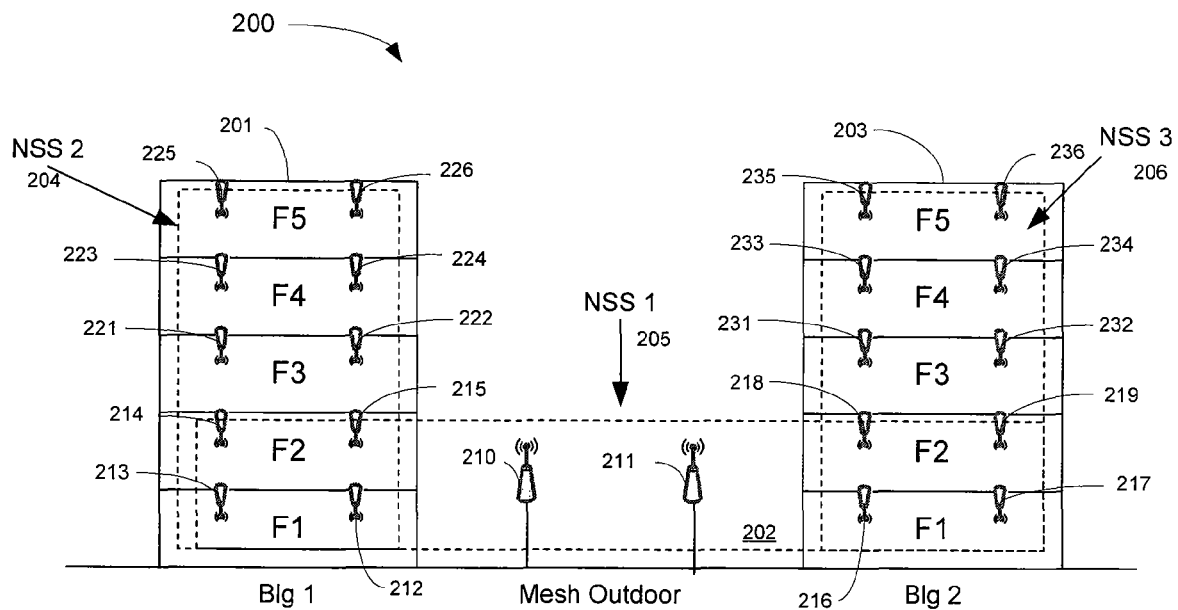
FIG. 2 illustrates an example of a network partitioned into Network Service Segments.

Referring now to FIG. 2, there is illustrated an example of a network 200 that is partitioned into network service segments (NSS). As used herein, a NSS is a cohesive grouping that provides one or more mobility services across a set of related infrastructure nodes such as APs. As will be illustrated in the example provided by FIG. 2, by forming NSSs, an area of the physical environment can be assigned to a Slave MSE (S-MSE). The physical environment within a NSS may suitably comprise a wired segment, a wireless segment or both wired and wireless segments. A NSS may suitably comprise one or more floors of a building, one or more buildings, one or more switches/controllers and zero or more APs. A NSS can ensure that all measurements for a tracked element are sent to a single service point (the appropriate S-MSE). The NSS can be different depending on service and/or device types associated with the service. For example, an NSS in an area with a high concentration of APs and/or mobile devices can be smaller than a NSS with a lower concentration of APs and/or mobile devices. As another example, a NSS for tracking associated devices may be smaller than a NSS for tracking rogue devices.

In the example illustrated in FIG. 2, network 200 comprises a first building 201, an outdoor area 202 and a second building 203. First building 201 and second building 203 comprises five floors, F1, F2, F3, F4, and F5.

In first building 201, the first floor F1 is serviced by APs 212, 213. The second floor F2 is serviced by APs 214, 215. The third floor F3 is serviced by APs 221, 222. The fourth floor F4 is serviced by APs 223, 224. The fifth floor F5 is serviced by APs 225, 226.

As illustrated in FIG. 2, outdoor area 202 is located between first building 201 and second building 203. Outdoor area 202 is serviced by APs 210, 211.

In second building 203, the first floor F1 is serviced by As 216, 217. The second floor F2 is serviced by APs 218, 219. The third floor F3 is serviced by APs 231, 232. The fourth floor F4 is serviced by APs 233, 234. The fifth floor F5 is serviced by APs 235, 236.

Network 200 is partitioned into 3 NSSs. The first NSS (NSS1) 202 comprises the first two floors F1, F2 of first building 201, outdoor area 202 and the first two floors F1, F2 of second building 203. The second NSS (NSS2) 204 comprises all five floors (F1, F2, F3, F4, F5) of first building 201. The third NSS (NSS3) 206 comprises all five floors (F1, F2, F3, F4, F5) of second building 203.

NSS 1 205 comprises APs 210, 211 in outside area 202, APs 212, 213, 214, 215 in first building 201 and APs 216, 217, 218, 219 in second building 203. NSS2 204 comprises APs 212, 213, 214, 215, 216, 221, 222, 223, 224, 225, and 226 in first building 201. NSS3 206 comprises APs 216, 217, 218, 219, 231, 232, 233, 234, 235, 236 in second building 203. Thus, APs 212, 2313, 214 and 215 belong to both NSS1 205 and NSS2 204, and APs 216, 217, 218 219 belong to both NSS1 205 and NSS3 206.

The overlapping coverage areas can enable a device to be handed off without a loss of service. For example, a device on the fifth floor F5 of first building 201 is in NSS2 204. As the device moves outside through the first floor of first building 201, the device is covered by both NSS2 204 and NSS1 205. As the device moves outdoors to outdoor area 202, the device remains in NSS1 205. If the device moves into second building 203, while on the first F1 and second F2 floors of second building 203, the device transitions from NSS1 205 to both NSS1 205 and NSS3 206.

Figure 3:
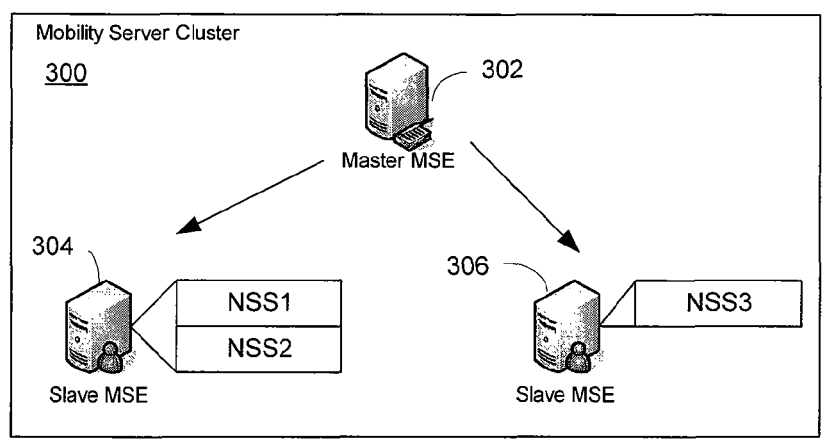
FIG. 3 illustrates an example Mobility Service Cluster providing mobility services for the network illustrated in FIG. 2.

FIG. 3 illustrates an example Mobility Service Cluster 300 providing mobility services for network 200 illustrated in FIG. 2. Master MSE 302 assigns the NSSs to balance the load among Slave MSEs 304, 306. In the illustrated example, NSS1 205 and NSS2 204 are assigned to Slave MSE 304, while Slave MSE 306 services NSS3 206.

Figure 4:
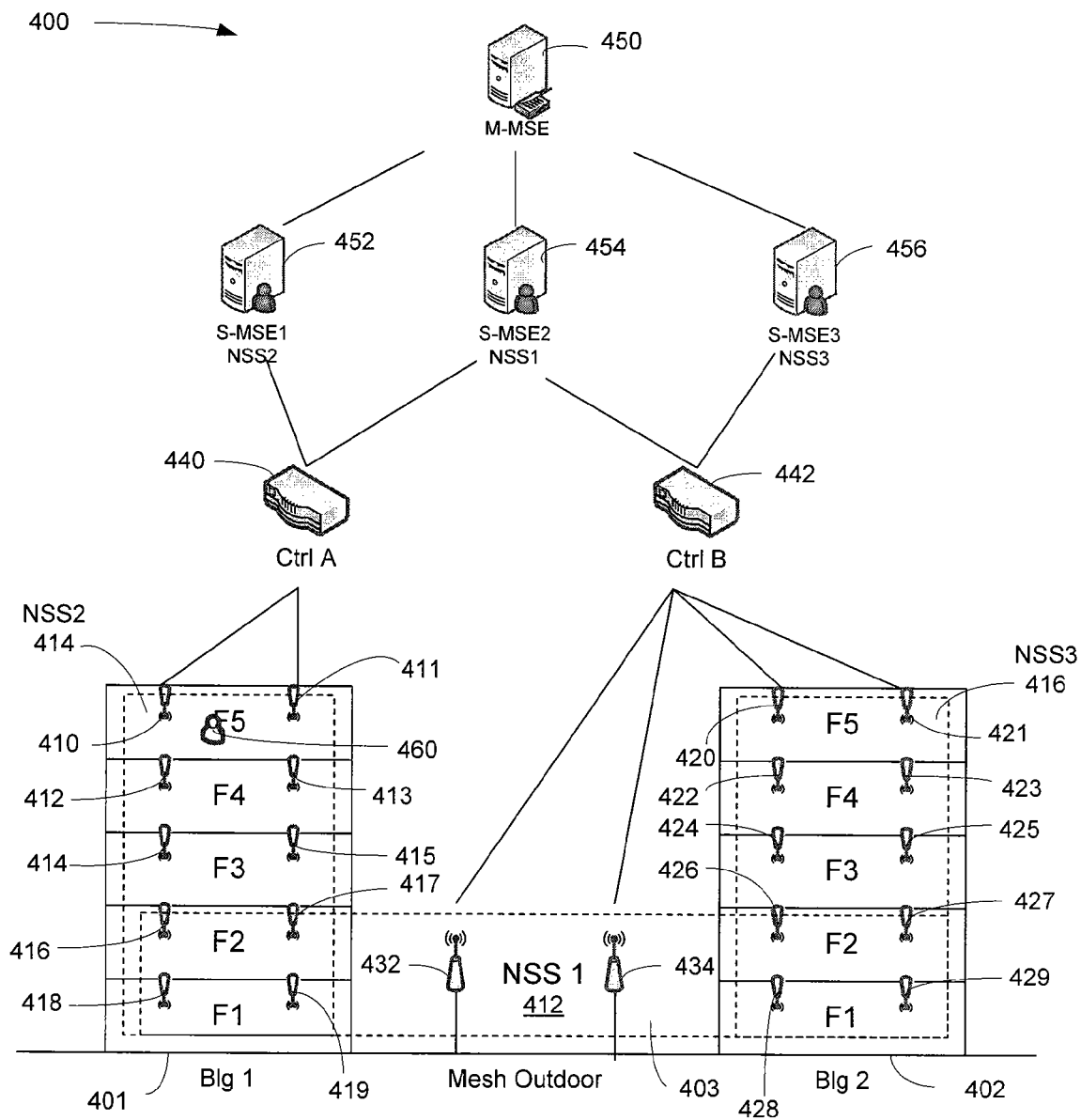
FIG. 4 illustrates an example single controller, single mobility service engine (MSE) embodiment.

FIG. 4 illustrates an example embodiment of a network 400 where a measurement for a device 460 is acquired by APs belonging to a single controller and single NSS. This embodiment employs a single cluster comprising Master MSE (M-MSE) 450 in data communication with Slave MSE (S-SME)1 452, S-MSE2 454 and S-MSE3 456. M-MSE 450 is operable to configure S-MSE1 452, S-MSE2 454, S-MSE3 456 and controllers 440, 442.

Controller 440 is in data communication with the APs 410, 411, 412, 413, 414, 415, 416, 417, 418, and 419 in first building 401. Controller 442 is in data communication with APs 420, 421, 422, 423, 424, 425, 426, 427, 428, and 429 in second building 402 and will APs 432, 434 in the outdoor area 403 between first building 401 and second building 402.

In the illustrated configuration, S-MSE1 452 services NSS2 414, S-MSE2 454 services NSS1 412 and S-MSE3 services NSS3 416. The APs in communication with controller 440 are either a member of NSS2 414 and/or NSS1 412. Thus, controller 440 is in data communication with S-MSE 452 (for servicing NSS2 414) and S-MSE 454 (for servicing NSS1 412). The APs in communication with controller 442 are either a member of NSS1 412 and/or NSS3 416. Thus, controller 442 is in data communication with S-MSE2 454 (for servicing NSS1 412) and S-MSE3 456 (for servicing NSS3 416).

For example, if a device 460 is located on the fifth floor (F5) of first building 401, the AP measurements for device 460 are communicated to controller 440. Controller 440 looks up the S-MSE mapping for NSS2 414 and determines that S-MSE1 452 is the S-MSE for NSS2 414. Controller 440 then forwards the AP measurements to S-MSE1 452. S-MSE1 452 can update M-MSE 450 with the current service data for device 460. In particular embodiments, if device 460 was previously unknown to S-MSE1 452, S-MSE1 452 notifies M-MSE 450 of device 460.

Figure 5:
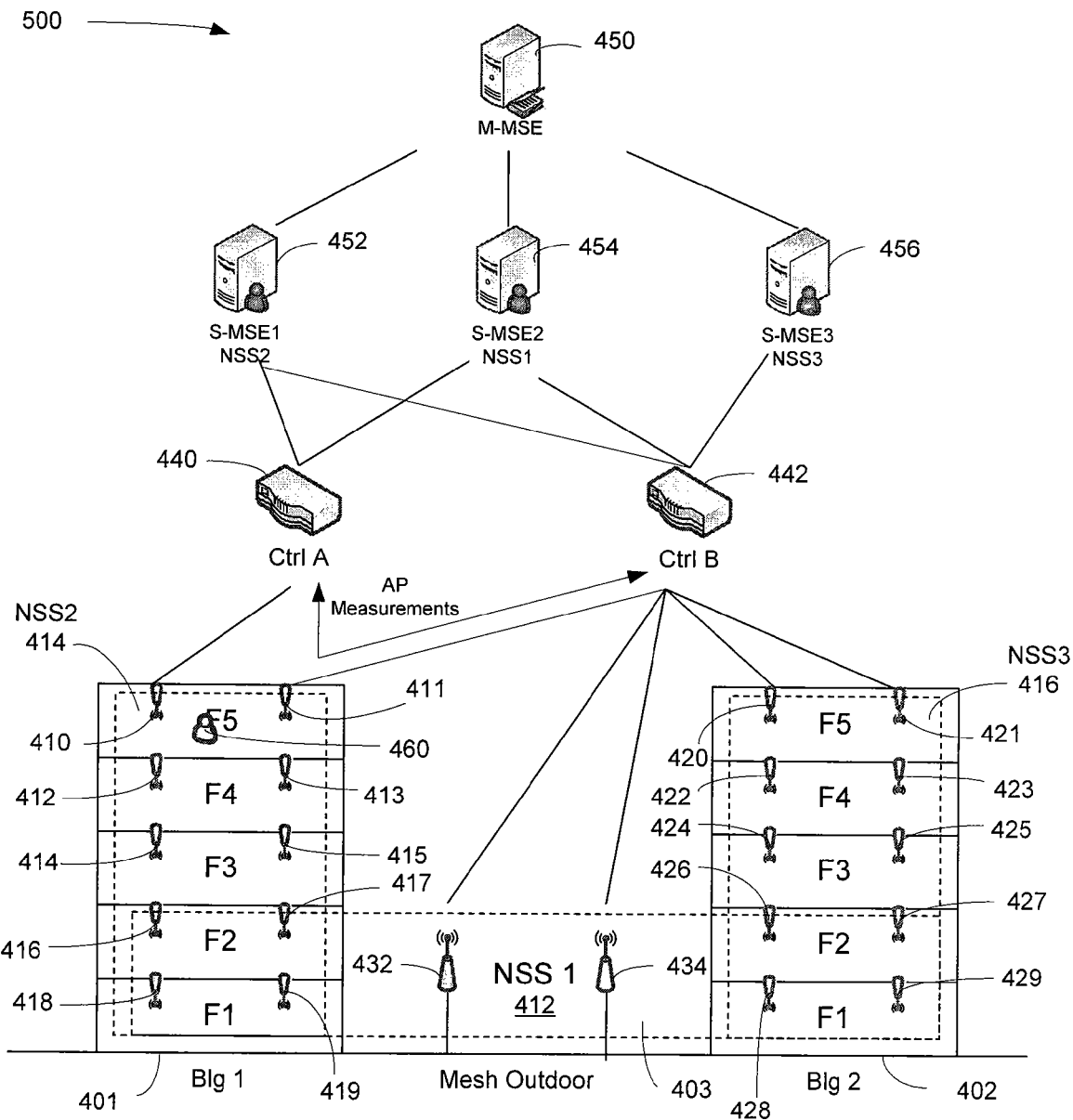
FIG. 5 illustrates an example multiple controller, single MSE embodiment.
Figure 6:
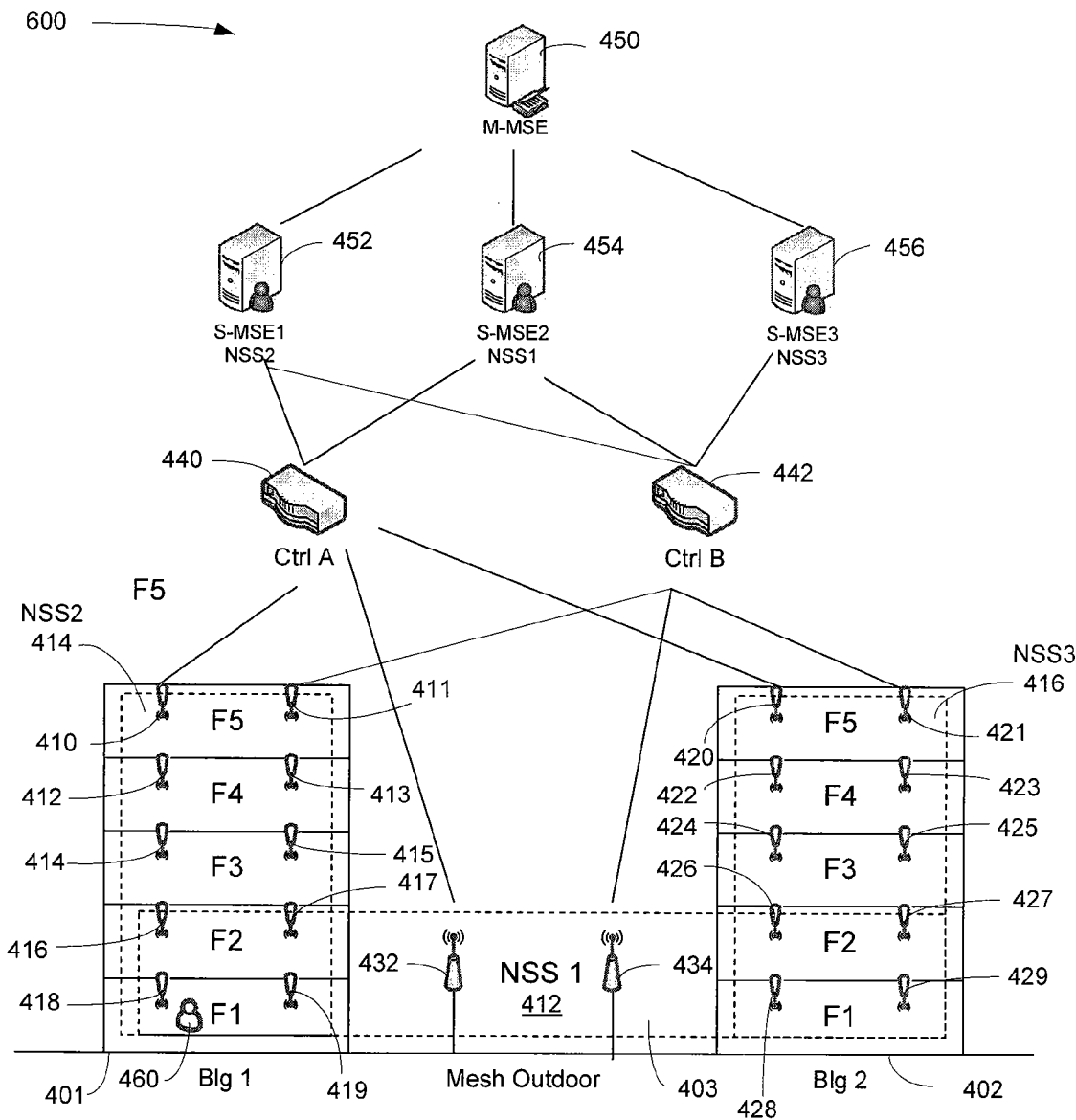
FIG. 6 illustrates an example multiple controllers, multiple MSE embodiment.

FIG. 5 is an example embodiment of a network 500 where measurements for a device (device 460) are received by APs 410, 411 associated with multiple controllers (controller 440, 442) and belong to a single NSS (NSS2 414). In this embodiment, AP 410 is coupled to controller 440 and AP 411 is coupled to controller 442.

In operation, when device 460 is in the fifth floor (F5) of first building 401, device 460 is in data communication with APs 410 and 411, which is in the domain of NSS1 414. AP measurements made by APs 410, 411 are communicated to controller 440 and 442 respectively. Controller 440 determines the S-MSE mapping for NSS2 414 (S-MSE1 452). Controller 440 forwards the measurements to S-MSE 452. Controller 442 also determines the S-MSE mapping for NSS2 414 (S-MSE1 452). Controller 442 likewise sends the measurements to S-MSE1 452. S-MSE1 452 can update M-MSE 450 with the current service data for device 460.

FIG. 5 is an example embodiment of a network 600 where measurements for a device (device 460) are received by APs (APs 418, 419) belonging to multiple NSS (NSS1 412, NSS2 414) and associated with multiple controllers (controller 440, 442). In operations, AP measurements are forwarded to controllers 440, 442. Controller 440 determines the S-MSE mapping for NSS1 412 (S-MSE1 452) and NSS2 414 (S-MSE2 454). Controller 440 forwards the measurements to both S-MSE1 452 and S-MSE2 454. Likewise, Controller 442 determines the S-MSE mapping for NSS1 412 (S-MSE1 452) and NSS2 414 (S-MSE2 454). Controller 442 forwards the measurements to both S-MSE1 452 and S-MSE2 454.

S-MSE1 452 notifies M-MSE 450 of device 460. Likewise, S-MSE2 454 notifies M-MSE 450 of device 460. M-MSE 450 is configured to evaluate which S-MSE provides the best location determination based on time, measurements and a confidence factor. If, for example, M-MSE 450 determines S-MSE 452 provides the best location determination, M-MSE 450 notifies S-MSE2 454 to forward device 460 traffic to S-MSE1 452.

In an example embodiment having Multiple MSEs, when a tracked element appears in multiple MSEs, all S-MSEs process the service for that element (for example, calculate location or determine voice handoff events, etc.). Each S-MSE periodically passes confidence factor, time, number of measurements, etc. to the M-MSE. The M-MSE decides which S-MSE provides primary service for the tracked element. The M-MSE notifies all secondary service providers to forward data to the primary service provider for the tracked element. The forwarding rules can be aged out on each S-MSE automatically if no data is received after a configurable time period.

Figure 7:
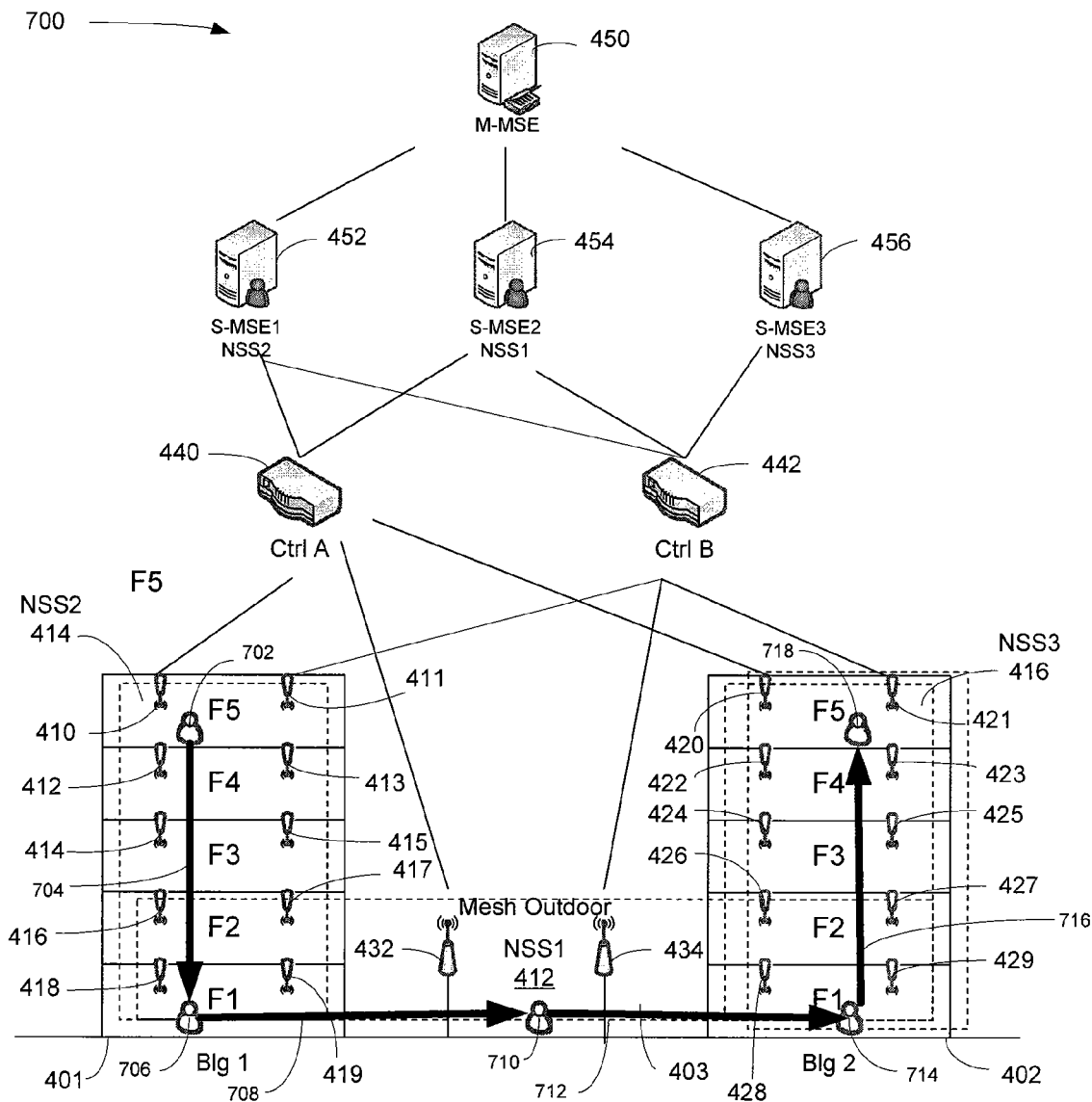
FIG. 7 illustrates an example handing off a roaming device.

FIG. 7 illustrates an example of a network 700 employing MSEs configured for handing off a roaming device. Handoff is controlled by the master MSE (M-MSE) 450. Handoff can be triggered based on confidence factor, time, measurements, etc. For example, better confidence and more recent and larger amounts of measurements can cause M-MSE 450 to handoff the roaming device to a new S-MSE.

In the illustrated example, a roaming device starts in NSS2 414, roams across NSS1 412 to NSS3 416. Initially, the device is located on the fifth floor (F5) of the first building 401 at location 702. Location 702 belongs to NSS2 414 which is serviced by S-MSE2 454. Controllers 440 and 442 route traffic for the device to S-MSE2 454.

The roaming device travels along path 704 to location 706 of the first floor (F1) of first building 401. The first (F1) and second (F2) floors of first building 401 belong to both NSS1 412 and NSS2 414. So as the device travels along path 704, it is transitioned from NSS2 414 to both NSS2 414 and NSS1 412 by M-MSE 450. M-MSE 450 communicates the transition to S-MSE1 452, S-MSE2 454 and controllers 440, 442. While at location 706 (or anywhere on floors F1, F2 of first building 401), controllers 440, 442 route traffic for the roaming device to both S-MSE1 452 and S-MSE2 454, which service NSS2 414 and NSS1 412 respectively.

The roaming device then travels along path 708 to location 710 which is in the outdoor area 402 between first building 401 and second building 402. As the roaming device exits the first building 401, M-MSE 450 transitions the roaming device to NSS1 412, serviced by S-MSE1 452. M-MSE 450 communicates the transition to S-MSE1 452, S-MSE2 454 and controllers 440, 442. In this example, NSS1 412 is configured to overlap with NBSS2 414 and NSS3 416 so there is no interruption of service to the roaming device as it enters/exits first building 401 and second building 402.

The roaming device then travels along path 712 to location 714. As the roaming device enters second building 402, the roaming device is in an area serviced by both NSS1 412 and NSS3 416. Thus, as the roaming device enters the second building, S-MSE 450 transitions the roaming device to NSS1 412 and NSS3 416 serviced by S-MSE2 454 and S-MSE3 456. M-MSE 450 communicates the transition to S-MSE2 454, S-MSE3 456 and controllers 440, 442.

The roaming device then travels along path 716 to location 718. As the roaming device moves above the second floor (F2) of second building 402, the roaming device is transitioned to NSS3 416 serviced by S-MSE3 456. M-MSE 450 communicates the transition to S-MSE2 454, S-MSE3 456 and controllers 440, 442.

Figure 8:
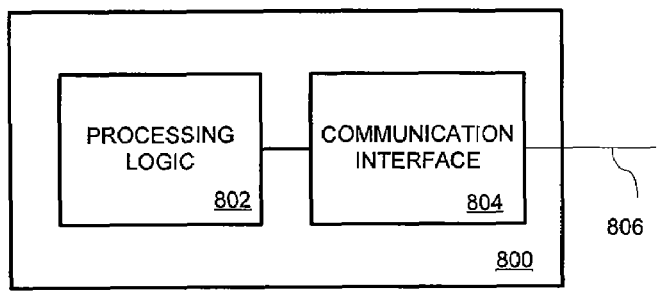
FIG. 8 is a block diagram of a Mobility Service Engine.

FIG. 8 is a block diagram of a MSE 800. MSE 800 is suitable for functioning as either a Master MSE (M-MSE) such as Master MSE 102 (FIG. 1), Master MSE 302 (FIG. 3) and/or M-MSE 450 in FIGS. 4-7; or as a Slave MSE such as Slave MSE 104, 106, 108 (FIG. 1), Slave MSE 304, 306 (FIG. 3) and/or S-MSE 452, 454, 456 (FIGS. 4-7).

MSE 800 comprises processing logic 802 for implementing the functionality described herein. The processing logic is in data communication with a communication interface 804 that enables communication between MSEs and also between an MSE and other infrastructures nodes such as APs, controllers and/or servers running applications. Communication interface 804 provides a two-way data communication via a communication link 806 that is connected to a local network (not shown). For example, communication interface 804 may be a local area network (LAN) card to provide a data communication connection to a compatible LAN. As another example communication interface 804 may be an integrated services digital network (ISDN) card or a modem to provide a data communication connection to a corresponding type of telephone line. Wireless links may also be implemented. In any such implementation, communication interface 804 sends and receives electrical, electromagnetic, or optical signals that carry digital data streams representing various types of information. In an example embodiment, communication interface 804 is coupled to a user interface such as a display and keypad allowing data to be manually entered.

In an example embodiment, MSE 800 is implemented as a standalone device. In another example embodiment, MSE 800 is co-located with another infrastructure component such as a server, controller, wireless domain controller, and/or a blade within a router.

In an example embodiment, MSE 800 is employed as an M-MSE. Processing logic 802 of MSE 800 employs an algorithm to form NSS. Processing logic 802 acquires RF neighbor maps from controllers in the mobility server cluster. Processing logic 802 is configured to combine the RF neighbor maps with the physical layout (e.g. building) of the network. Where possible, processing logic 802 keeps adjacent floors of a building within the same NSS. Processing logic 802 determines the active service(s) for the MSE Cluster NSS.

Processing logic 802 employs an algorithm to evenly divide the NSS across a set of S-MSEs. Where possible, processing logic 802 assigns NSS within the same proximity to the same S-MSE.

For example, processing logic 802 may form one or more NSS from all APs and switch ports. For example, for a simple indoor, one building network, processing logic 802 may form one NSS. This provides the simplest NSS environment wherein all switches and/or APs belong to the same NSS. For a complex indoor, one building network, processing logic 802 may form multiple NSS. Typically, multiple NSS are formed for large buildings or buildings with large AP/Switch port counts. In addition, outdoor areas are considered. A NSS may overlap where indoor and outdoor areas are physically close (see e.g. FIGS. 4-7). In an example embodiment, a NSS is service specific. For example one NSS may be employed for location services, one for voice handoff, and another for passive handoff, etc.

In an example embodiment, each NSS is assigned to a single S-MSE. Multiple NSS may be assigned to the same S-MSE. For each mobility server cluster, all switches, controllers, network designs and APs are configured on the M-MSE. The configurations are communicated to the appropriate S-MSE. Each S-MSE pushes its NSS list to each controller that is currently managing APs belonging to the NSS. Each AP will be configured with NSS assignments by the controller.

In an example embodiment, whenever a measurement or relevant information is retrieved on a NSS, the controllers forward the data to the appropriate S-MSE registered for the NSS. If a single AP is in multiple NSS, the measurement data is sent to all S-MSEs managing the set of NSSs. Each controller may be communicating with multiple S-MSEs at the same time, but for different NSSs.

In operation, when a tracked element appears on multiple MSE, all MSEs process service for the tracked element (e.g. calculated location or determine voice handoff events). S-MSEs periodically pass data such as confidence factor data, time, and number of measurements to M-MSE 800. Processing logic 802 of M-MSE 800 decides which S-MSE provides primary service to the tracked element. M-MSE 800 notifies all secondary service providers to forward data to the primary service provider for the tacked element. Forwarding rules can be aged out on each S-MSE automatically if no data is received after a configurable time period.

In an example embodiment, the mapping of NSS is periodically refreshed based on network topology changes to the RF neighbor and AP to controller mappings by processing logic 802. All controllers in a mobility domain have NSS mappings. APs get NSS mapping and provide to controller when connecting to controller. Controller then contacts S-MSE. An S-MSE detects topology changes and pushes changes to controllers. The M-MSE should receive either directly or indirectly topology change updates. In particular embodiments, a NSS does not cross mobility domain boundaries.

In an example embodiment, processing logic 802 provides Master MSE functions described herein. For example, all configurations for the cluster are configured on the M-MSE. The M-MSE synchronizes the configuration as necessary with the set of S-MSE. The M-MSE can provide directory services. For example the M-MSE can provide a directory lookup for all tracked devices and which S-MSE the tracked device is currently located. The M-MSE can provides a directory lookup for all network designs (and parts of), controllers that each S-MSE is currently tracking. The M-MSE can also provide auto assignment. For example, the M-MSE can automatically determine which S-MSE manages which parts of the physical and network topology. The M-MSE provides for Load-Balancing. For example, the M-MSE load balances across the set of S-MSE in the cluster based on network and physical environment active monitoring and feeds this data into the auto-assignment algorithms. The M-MSE can also provide for High Availability (HA) for M-MSE functions. The M-MSE can also provide redundancy control. Upon detection of S-MSE failure, the M-MSE can perform standby coordination with another S-MSE in the cluster. The M-MSE can be suitably configured to maintain history data. The history data including tracked device information, location, roaming . . . etc is aggregated by the M-MSE. The M-MSE can also provide Time Synchronization. For example, the M-MSE provides a central time synchronization function so that all S-MSE are in sync when reporting time for live or historical data.

In an example embodiment, the M-MSE provides an Application Programming Interface (API). External applications communicate with the M-MSE to manage the cluster, query cluster information or subscribe to events. Queries and subscriptions are pushed to the appropriate set of S-MSE based on the scope of query or subscription. If a query or subscription is for an area or floor then the M-MSE uses the directory services to map the query to the correct S-MSE that is tracking that floor. For queries that may span multiple S-MSE the M-MSE provides aggregation query capability.

In an example embodiment, the M-MSE is managed by a WCS (for example Cisco's Wireless Control System). The M-MSE comprises a central configuration database that includes all network designs, controllers, switches, APs. The M-MSE has a central directory of S-MSE IP address, authentication credentials, etc. This data could be configured by WCS and pushed to the M-MSE. Alternatively, this data could be auto-discovered by using DNS and having each location cluster assigned a DNS domain, each S-MSE being assigned locally to the domain. Then the M-MSE could discover all S-MSE in a particular location cluster by using SAF (Service Access Facilities) between an S-MSE and the M-MSE. The M-MSE synchronizes the central configuration database with all of the S-MSEs. Synchronization can be event driven (for example when it is configured on the M-MSE by WCS) and periodically checked for changes by the M-MSE reading each S-MSE change count on the configuration database. Cluster status monitoring is provided by M-MSE to WCS. This can include Up/down status of S-MSEs and/or Load monitoring on each S-MSE.

In an example embodiment, the M-MSE maintains a directory service lookup for tracked devices to S-MSE. The directory may suitably comprise multiple indexes. For example a Primary index comprising MAC Addresses, a Secondary index comprising IP Addresses and a Tertiary index comprising Usernames. The actual tracked device information is stored on the S-MSE. Each S-MSE sends a notification to the M-MSE as tracked devices appear on their network segment. The M-MSE updates the directory service if that device has roamed from another S-MSE. The M-MSE maintains a directory lookup for all network designs, the network segments, switches and controllers that each S-MSE is currently tracking. All directory services information can be exposed for query by applications or S-MSEs.

In an example embodiment, the M-MSE performs historical data aggregation. As devices are tracked in the network by the S-MSE history and data is collected over time on that device. This information is persistent on the S-MSE until successfully archived on the M-MSE, then flushed from the S-MSE. Periodically this information is "posted" to the M-MSE for aggregation and archiving. Posting to the M-MSE can be based on volume of data as well as time-based triggers. The M-MSE has the responsibility to correctly order all data sent from multiple S-MSE for the same tracked device, thus all S-MSEs and the M-MSE are time synchronized.

In an example embodiment, the M-MSE provides load balancing. Static and Dynamic load balancing can be provided. For static load balancing, part of the auto-assignment algorithm assigns appropriate NSS across S-MSE. For dynamic load balancing, the M-MSE is configured to detect the load on each S-MSE and per-NSS load on that S-MSE. This enables the M-MSE to determine how to re-organize NSS assignments across S-MSE based on tracking load.

In an example embodiment, the M-MSE provides redundancy control. The M-MSE and each S-MSE can employ a heart-beat signal between them. After detection of an S-MSE failure, the M-MSE will automatically reallocate all network segments assigned to the failed S-MSE to one or more other S-MSE in the cluster. Upon detecting recovery of the S-MSE, the M-MSE will perform the automatic balancing of network segments again.

In an example embodiment, the M-MSE provides High Availability (HA). A HA Pair is a set of two servers that provide duplicate function. An M-MSE and/or an S-MSE can belong to HA Pair. Each device in the HA Pair has a shared virtual IP address and individual IP address. A solid HA database option will synchronize all state and persistent data. In particular embodiments, all necessary state data for hand-off is stored in a database. Non persistent state (e.g., a Received Signal Strength Indication "RSSI" cache) is rebuilt upon failover.

In an example embodiment, processing logic 802 of MSE 800 can be employed to implement slave MSE functions. For each network location segment assigned to the S-MSE, processing logic 802 provides tracking of the network topology and devices in that topology, query and subscription processing on the network topology and devices and/or RF Neighbor topology monitoring and forwarding changes to the M-MSE. Any event subscriptions from external applications configured on the S-MSE by the M-MSE will be handled directly from the S-MSE to the application.

Figure 9:
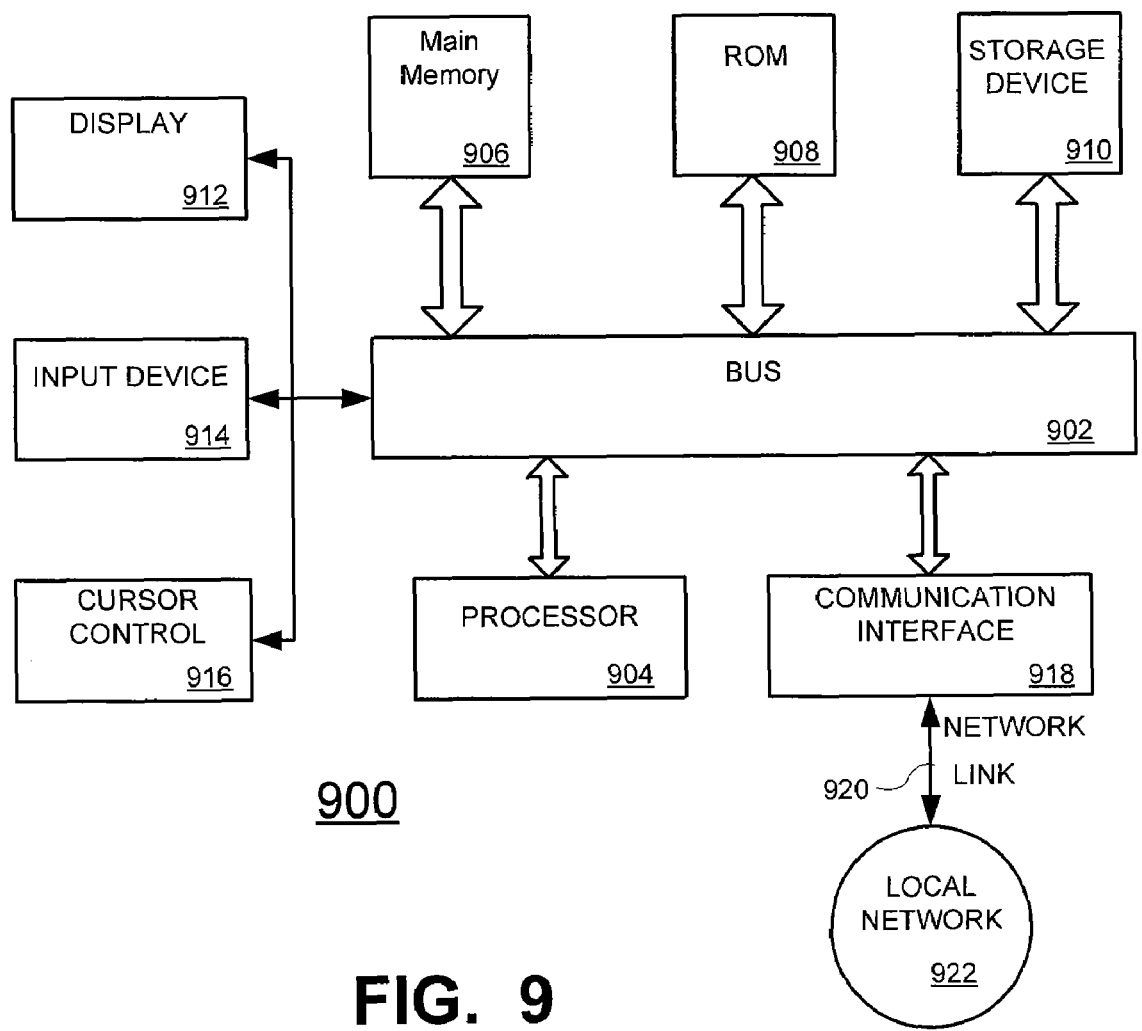
FIG. 9 is a block diagram that illustrates a computer system upon which an example embodiment may be implemented.

FIG. 9 is a block diagram that illustrates a computer system 900 upon which an example embodiment may be implemented. For example computer system 900 can be employed to implement MSE 800 (FIG. 8) or any of the Master MSE and/or Slave MSE embodiments described herein. Computer system 900 includes a bus 902 or other communication mechanism for communicating information and a processor 904 coupled with bus 902 for processing information. Computer system 900 also includes a main memory 906, such as random access memory (RAM) or other dynamic storage device coupled to bus 902 for storing information and instructions to be executed by processor 904. Main memory 906 also may be used for storing a temporary variable or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912 such as a cathode ray tube (CRT) or liquid crystal display (LCD), for displaying information to a computer user. An input device 914, such as a keyboard including alphanumeric and other keys is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g. x) and a second axis (e.g. y) that allows the device to specify positions in a plane.

An aspect of the example embodiment is related to the use of computer system 900 for mobility service clustering. According to an example embodiment, mobility service clustering is provided by computer system 900 in response to processor 904 executing one or more sequences of one or more instructions contained in main memory 906. Such instructions may be read into main memory 906 from another computer-readable medium, such as storage device 910. Execution of the sequence of instructions contained in main memory 906 causes processor 904 to perform the process steps described herein. One or more processors in a multiprocessing arrangement may also be employed to execute the sequences of instructions contained in main memory 906. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 904 for execution. Such a medium may take many forms, including but not limited to non-volatile media, volatile media, and transmission media. Non-volatile media include for example optical or magnetic disks, such as storage device 910. Volatile media include dynamic memory such as main memory 906. Transmission media include coaxial cables, copper wire and fiber optics, including the wires that comprise bus 902. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 904 for execution. For example, the instructions may initially be borne on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906 from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling computer system 900 to a network link 920 that is connected to a local network 922.

For example, communication interface 918 may be a local area network (LAN) card to provide a data communication connection to a compatible LAN. As another example, communication interface 918 may be an integrated services digital network (ISDN) card or a modem to provide a data communication connection to a corresponding type of telephone line. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922. Local network 922 may use electrical, electromagnetic, or optical signals that carry the digital data to and from computer system 900.

Computer system 900 can send messages and receive data, including program codes, through the network(s), network link 920, and communication interface 918. In the Internet example, a server 930 might transmit a requested code for an application program through local network 922, and communication interface 918. In accordance with an example embodiment, one such downloaded application provides for mobility service clustering as described herein.

The received code may be executed by processor 904 as it is received, and/or stored in storage device 910, or other non-volatile storage for later execution. In this manner, computer system 900 may obtain application code in the form of a carrier wave.

Figure 10:
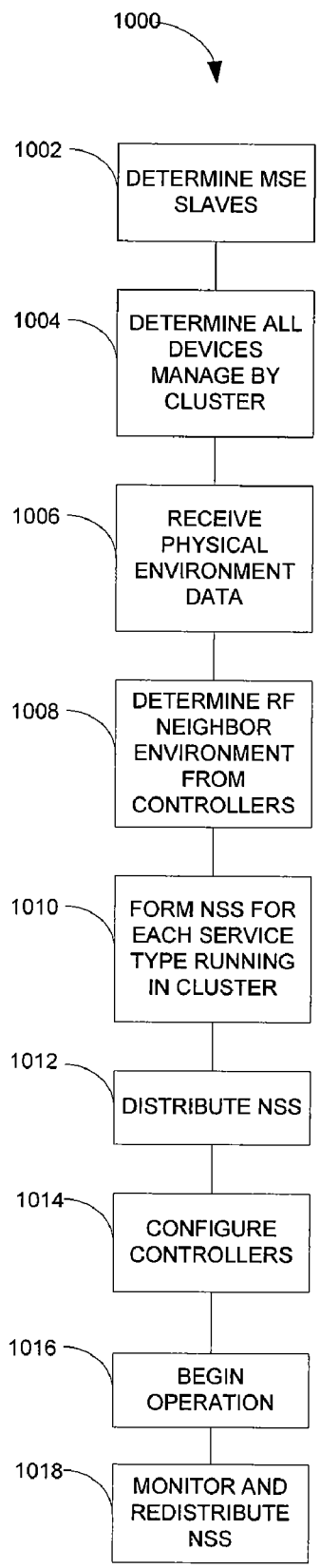
FIG. 10 is a block diagram illustrating a method of operation for a network employing a Mobility Service Engine (MSE) cluster.

In view of the foregoing structural and functional features described above, a methodology in accordance with an example embodiment will be better appreciated with reference to FIG. 10. While, for purposes of simplicity of explanation, the methodology of FIG. 10 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. The methodology described herein is suitably adapted to be implemented in hardware, software, or a combination thereof.

FIG. 10 is a block diagram illustrating a method 1000 of operation for a network employing a MSE cluster. At 1002, the MSE Cluster Master determines all of MSE Cluster Slaves in the cluster. At 1004, the MSE Cluster Master determines all of the network devices, such as controllers, Access Points, etc., managed by the cluster. At 1006, the MSE Cluster Master is configured with physical environment data about the network. The physical environment data may include campus layout, buildings, outdoor areas, etc. The data may be received from a management system (for example Cisco's Wireless Control System "WCS" available from Cisco Systems, Inc., 170 West Tasman Drive, San Jose, Calif.). At 1008, the MSE Cluster Master determines Radio Frequency (RF) neighbor environment from the controllers.

At 1010, the MSE Cluster Master runs an auto-assignment algorithm to form Network Service Segments (NSS) for each service type running in the cluster. The auto-assignment algorithm defines the boundaries of the NSS in physical environment. At 1012, the MSE Cluster Master distributes NSS across MSE Cluster Slaves. At 1012, the MSE Cluster Slaves configure controllers that are part of their NSS. The controllers can be configured to forward data for their NSS to the appropriate MSE Cluster Slave. A controller may belong to one or more NSS. The controllers are configured to maintain a mapping of AP/Data to NSS/Slave.

At 1016, the Controllers forward appropriate service data (e.g. location RSSI measurements) to the MSE Cluster Slave processing the NSS. At 1018, MSE Cluster Slaves then receive the data, calculate or perform the service for the NSS measured data. At 1018, the MSE Cluster Master monitors the load of NSS processing on each MSE Cluster Slave and determines dynamically if one or more NSS need to be redistributed across cluster slaves so that load is evenly distributed. If a MSE Cluster Slave goes down, the MSE Cluster Master will automatically re-distribute NSS assigned to the down slave to one or more active MSE Cluster Slaves. A controller for a re-distributed NSS can be reconfigured to forward data to the new MSE Cluster Slave.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A method, comprising:
   determining mobility service engine slaves belonging to a cluster;

determining all devices managed by the cluster, the devices managed by the cluster comprising a first mobility service engine cluster slave, a second mobility service engine cluster slave, a first controller in communication with the first mobility service engine cluster slave, and a second controller in communication with the first mobility service engine cluster slave and the second mobility service engine cluster slave;

acquiring data representative of a physical layout, the data representative of the physical layout comprising data representative of an area serviced by each of the devices managed by the cluster;

receiving radio frequency neighbor environment data from controllers associated with the cluster;

forming a plurality of network service segments for the cluster based on the radio frequency environment, wherein a network service segment is a cohesive grouping that provides at least one mobility service across a set of related infrastructure nodes; and assigning each of the plurality of network service segments to not more than one of the mobility service engine slaves;

wherein assigning further comprises assigning a selected one network service segment selected from the plurality network service segment to a cluster slave selected from the group consisting of the first mobility service engine cluster slave and the second mobility service engine cluster slave to service;

wherein assigning further comprises communicating a routing path to controllers having infrastructure nodes belonging to the selected one network service segment.

2. The method of claim 1, further comprising:

monitoring radio frequency neighbor environment data; and re-forming the plurality of network service segments responsive to detecting changes in the radio frequency neighbor environment.

3. An apparatus, comprising:

a processor;

a communication interface; and logic configured to receive data from the communication interface;

wherein the logic is configured to acquire data representative of at least one Mobility Service Engine cluster slave belonging to a mobility service cluster via the communication interface;

wherein the logic is configured to acquire physical layout data for a network; and wherein the logic is configured to form at least one network service segment based on the physical layout data, the network service segment is a cohesive grouping that provides at least one mobility service across a set of related infrastructure nodes wherein the mobility service cluster provides service to a campus environment comprising a first building, a second building, and an outdoor area extending from the first building to the second building; and wherein the logic is configured to form a first network service segment for providing the service for the first building, a second network service segment for providing the service to the second building, and a third network service segment for providing the service to the outdoor area wherein the logic determines the load for the first network service segment, the second network service segment and the third network service segment; and wherein the logic assigns the first network service segment to one of a first of the at least one Mobility Service Engine cluster slave and a second the at least one Mobility Service Engine cluster slave, the second network service segment to one of the first the at least one Mobility Service Engine cluster slave and the second the at least one Mobility Service Engine cluster slave and the third network service segment to one of the first the at least one Mobility Service Engine cluster slave and the second the at least one Mobility Service Engine cluster slave; and wherein the logic assigns the first network service segment, second network service segment and third network service segment in a manner that best balances a load between the first the at least one Mobility Service Engine cluster slave and the second the at least one Mobility Service Engine cluster slave.

4. The apparatus of claim 3, the network service segment is bounded by a physical area selected from the group of at least one floor of a building, at least one building, at least one switch, at least one controller and at least one access point.

5. The apparatus of claim 3, wherein the physical layout data includes location of access points within the mobility service cluster;

wherein the logic is configured to determine a set of access points from within the access points within the mobility service cluster belonging to the network service segment; and wherein the logic is further configured to communicate the set of access points belonging to the network service segment to a mobility service Engine cluster slave assigned to service the network service segment.

6. The apparatus of claim 3, wherein service to the outdoor area is provided by a mesh network.

7. The apparatus of claim 3, wherein the logic forms the third network service segment to overlap with the first network service segment and the second network service segment.

8. The apparatus of claim 3, wherein at least one network service segment is defined for a mesh network.

9. The apparatus of claim 3, wherein the logic communicates the assignments of the first network service segment, the second network service segment and the third network service segment to the controllers assigned to service the first network service segment, the second network service segment and the third network service segment.

10. The apparatus of claim 3, wherein the logic assigns a network service segment to more than one Mobility Service Engine cluster slave.

11. The apparatus of claim 3, wherein the logic is configured to receive data from a plurality of Mobility Service Engine cluster slaves representative of a load on each of the plurality of Mobility Service Engine cluster slaves; and wherein the logic is configured to redistribute network service segments among the plurality of Mobility Service Engine cluster slaves to balance the load on the plurality of Mobility Service Engine cluster slaves.

12. The apparatus of claim 3, wherein the logic is configured to automatically reassign a network service segment assigned to a first Mobility Service Engine cluster slave to a second Mobility Service Engine cluster slave responsive to determining the first Mobility Service Engine cluster slave has failed.

13. The apparatus of claim 3, wherein the logic is configured to determine radio frequency neighbor environment from at least one controller in communication with the communication interface.

14. The apparatus of claim 13, wherein the logic is configured to receive updates of the radio frequency environment and access point to controller mappings via the communication interface; and wherein the logic is configured to re-form the at least one network service segment responsive to one of a group consisting of a change of the radio frequency environment and a change of access point to controller mapping.

15. A system, comprising:

a mobility service engine cluster master;

a first mobility service engine cluster slave in communication with the mobility service engine cluster master;

a second mobility service engine cluster slave in communication with the mobility service engine cluster master;

a first controller in communication with the first mobility service engine cluster slave and the second mobility service engine cluster slave;

a second controller in communication with the first mobility service engine cluster slave and the second mobility service engine cluster slave;

wherein the mobility service engine cluster master is configured to acquire data representative of at least one Mobility Service Engine cluster slave belonging to a mobility service cluster via the communication interface;

wherein the mobility service engine cluster master is configured to acquire physical layout data comprising areas serviced by infrastructure nodes coupled to the first controller and areas serviced by infrastructure nodes coupled to the second controller;

wherein the mobility service engine cluster master is configured to form at least one network service segment, the network service segment is a cohesive grouping that provides at least one mobility service across a set of related infrastructure nodes;

wherein the mobility service engine cluster master is further configured to assign the network service segment to a cluster slave selected from the group consisting of the first mobility service engine cluster slave and the second mobility service engine cluster slave to service;

wherein the selected cluster slave is configured to communicate a routing path to controllers having infrastructure nodes belonging to the network service segment.

16. The system of claim 15, further comprising an access point coupled to the first controller;

wherein the first controller is operative to provide the access point with network service segment data for the access point to forward data received from a mobile unit.

17. The system of claim 16, wherein the access point moves from a first area serviced by the first controller to a second area serviced by the second controller;

wherein the access point is responsive to moving to the second area to communicate to the controller network service segment data indicating a network service segment that the access point is currently configured to service wherein the controller is configured to forward data for the network service segment to the first/second mobility engine service cluster slave.

18. The system of claim 17, wherein the second controller is configured to send data to the mobility service engine cluster slave indicating the access point has roamed to the second controller responsive to the access point roaming to the second controller wherein the mobility service engine cluster slave is responsive to receiving data from the second controller indicating the access point has roamed to the second controller to forward data indicating the access point has roamed to the second controller to the mobility service engine cluster master wherein the mobility service engine cluster master is responsive to receiving data indicating the access point has roamed to the second controller to determine whether the access point should be assigned another network service segment.

19. The system of claim 16, further comprising a tracked element in communication with the access point;

wherein the first controller is configured to maintain a mapping of access point to network service segments; and wherein the first controller is configured to automatically route data from the tracked element to the mobility service engine slave servicing a network service segment mapped to the access point.

20. The system of claim 19, wherein the access point is associated with a plurality of network service segments; and wherein the first controller is configured to automatically route data from the tracked element to all of the plurality of network service segments associated with the access point.

* * * * *